(12) United States Patent
Grandpre et al.

(10) Patent No.: US 11,231,843 B2
(45) Date of Patent: Jan. 25, 2022

(54) ANIMATED SLIDES EDITOR FOR GENERATING AN ANIMATED EMAIL SIGNATURE

(71) Applicant: E-Sig Marketing LLC, Eden Prairie, MN (US)

(72) Inventors: Stewart Patrick Grandpre, Minneapolis, MN (US); Ryan Kasper-Cook, Minnetrista, MN (US)

(73) Assignee: E-SIG MARKETING LLC, Eden Prairie, MN (US)

( * ) Notice: Subject to any disclaimer, the term of this patent is extended or adjusted under 35 U.S.C. 154(b) by 121 days.

(21) Appl. No.: 16/292,914

(22) Filed: Mar. 5, 2019

(65) Prior Publication Data

US 2019/0272083 A1    Sep. 5, 2019

Related U.S. Application Data

(60) Provisional application No. 62/638,539, filed on Mar. 5, 2018.

(51) Int. Cl.
| | | |
|---|---|---|
| *H04L 12/58* | (2006.01) | |
| *G06F 3/0484* | (2013.01) | |
| *G06F 16/438* | (2019.01) | |
| *G06F 3/0482* | (2013.01) | |
| *G06T 11/60* | (2006.01) | |
| *G06T 13/80* | (2011.01) | |

(52) U.S. Cl.
CPC ........ *G06F 3/04845* (2013.01); *G06F 3/0482* (2013.01); *G06F 16/4393* (2019.01); *G06T 11/60* (2013.01); *G06T 13/80* (2013.01); *H04L 51/10* (2013.01); *G06T 2210/62* (2013.01)

(58) Field of Classification Search
None
See application file for complete search history.

(56) References Cited

PUBLICATIONS

How to Make a GIF Using Giphy (Published on Oct. 8, 2017 by Nick Carbonaro) https://www.youtube.com/watch?v=QrrlOgUHiFE.*
How to Add a GIF in Outlook (Publihsed on Sep. 21, 2016 by Lisa Tate) https://www.crossware.co.nz/blog/how-to-add-a-gif-in-outlook/.*

(Continued)

*Primary Examiner* — Rinna Yi
(74) *Attorney, Agent, or Firm* — Kinney & Lange, P.A.

(57) ABSTRACT

A server device for use in a system including a sender client and a recipient client includes one or more processors and an animated slide editor. The animated slide editor is executable by the one or more processors to present a graphical user interface that enables user interaction to upload a plurality of images to the server device for inclusion in an animated image file. The animated image file defines an animated image that is displayed within a signature block region of an email transmitted from the sender client. The animated slide editor stores the animated image file within memory of the server device, and generates computer-readable instructions for insertion into the email transmitted from the sender client. The computer-readable instructions cause the recipient client to retrieve the animated image file stored at the server device, and display the animated image in the signature block region of the received email.

16 Claims, 8 Drawing Sheets

(56) References Cited

PUBLICATIONS

Word 2007 Tutorial 14—Working With Shapes and Drawing Tools (Publihsed on Aug. 9, 2009 by Schoolfreeware) https://www.youtube.com/watch?v=rizKlbz42wo.*

How To Use GIPHY Slideshow (published on May 12, 2017 by Team Giphy) https://giphy.com/posts/how-to-use-giphy-slideshow/.*

* cited by examiner

Fig. 2G

ANIMATED SLIDES EDITOR FOR GENERATING AN ANIMATED EMAIL SIGNATURE

CROSS-REFERENCE TO RELATED APPLICATION(S)

This Application claims the benefit of U.S. Provisional Application No. 62/638,539 filed Mar. 5, 2018 for "ANIMATED EMAIL SLIDES EDITOR" by S. Grandpre, the contents of which are hereby incorporated by reference in their entirety.

BACKGROUND

The present disclosure relates generally to computer systems, and more particularly to animated slides for use with electronic mail applications.

Electronic mail (email) has become ubiquitous with both personal and commercial communications. To facilitate the ease of use of email systems, templates of user signatures are often available and customizable to provide personalized signatures to each email that is transmitted from a user. Such signature templates are inserted into an email when the email is transmitted, thereby enabling the user to provide a standardized email signature including, e.g., a name, title, address, telephone number, or other personal and/or contact information without requiring such information to be manually typed or otherwise appended to each transmitted email. Some email signature templates enable users to insert images, such as photos or other images to the email signature, thereby enabling company logos or other image data to be included with the email signature.

SUMMARY

In one example, a server device for use in a system including a sender client device and a recipient client device includes one or more processors and an animated slide editor. The animated slide editor is executable by the one or more processors to present a graphical user interface that enables user interaction to upload a plurality of images to the server device for inclusion in an animated image file that defines an animated image that is displayed within a signature block region of an email transmitted from the sender client device. The animated slide editor is further executable by the one or more processors to generate the animated image file using the plurality of uploaded images, store the animated image file within memory of the server device, and generate computer-readable instructions for insertion into the email transmitted from the sender client device. The computer-readable instructions are configured to cause the recipient client device to retrieve, in response to receiving the email transmitted from the sender client device, the animated image file stored at the server device, and display, in the signature block region of the received email transmitted from the sender client device, the animated image defined by the animated image file.

In another example, a method of generating an animated email signature includes executing, by a server device, an animated slide editor. The animated slide editor presents a graphical user interface that enables user interaction to upload a plurality of images to the server device for inclusion in an animated image file that defines an animated image that is displayed within a signature block region of an email transmitted from a sender client device. The method further includes: receiving, by the server device, the plurality of images; generating, by the animated slide editor using the plurality of images, the animated image file that defines the animated image; and storing, by the animated slide editor, the animated image file within memory of the server device. The method further includes generating, by the animated slide editor, computer-readable instructions for insertion into the email transmitted from the sender client device. The computer-readable instructions are configured to cause a recipient client device to: retrieve, in response to receiving the email transmitted from the sender client device, the animated image file stored within the memory of the server device; and display, in the signature block region of the received email transmitted from the sender client device, the animated image defined by the animated image file.

In another example, a method includes executing, by a server device, an animated slide editor that presents a graphical user interface that enables user interaction to upload a plurality of images to the server device for inclusion in an animated image file that defines an animated image that is displayed within a signature block region of an email transmitted from a sender client device. The method further includes: accessing, by a sender client device that is remote from and communicatively coupled with the server device, the animated slide editor to display the graphical user interface at the sender client device; receiving, at the sender client device via the graphical user interface, the user interaction to upload the plurality of images to the server device; and uploading the plurality of images from the sender client device to the server device. The method further includes: receiving, at the server device, the plurality of images uploaded from the sender client device; generating, by the animated slide editor using the plurality of images, the animated image file that defines the animated image; storing, by the animated slide editor, the animated image file within memory of the server device; generating, by the animated slide editor, computer-readable instructions for insertion into the email transmitted from the sender client device; and generating, by the sender client device, the email transmitted from the sender client device. The method further includes: inserting, by the sender client device prior to transmitting the email, the computer-readable instructions into the email; transmitting the email from the sender client device; and receiving, by a recipient client device that is remote from and communicatively coupled to both the sender client device and the server device, the email transmitted from the sender client device. The method further includes: executing, by the recipient client device in response to receiving the email, the computer-readable instructions inserted into the email; retrieving, by the recipient client device from the server device in response to executing the computer-readable instructions, the animated image file stored within the memory of the server device; and displaying, by the recipient client device within the signature block region of the email, the animated image defined by the animated image file.

DETAILED DESCRIPTION

According to techniques of this disclosure, an animated slide editor (ASE) enables users to create time-cycled slide presentations (e.g., slideshows) of graphical and/or textual data that is inserted into email signatures of outgoing emails. The ASE can be an add-on web-based program or application that creates animated slide presentations for email signatures. The ASE provides the ability to add text, photos, logos or any other visual information directly onto separate slides, which are then rotated one at a time as a slide show within a received email. The ASE enables a user to specify the amount of time that each slide is presented before a subsequent slide populates. As such, the ASE gives users the ability to manage the slides as full motion animation or as a single frame slide presentation.

Rather than require a predesigned compilation of slides created using an advanced design program, the ASE is an application created and designed to allow a novice user to create a compilation of slides for animation directly into an email. As such, the ASE presents graphical control elements that do not require complex computer skills, but rather those skills that are typically within the basic knowledge of novice computer users, such as typing text and selecting files within a graphically-presented file system. The ASE groups images into a single unit slide show to be either hosted on a server or placed directly into the outgoing email. As such, because the slide presentation can be hosted on a remote server and inserted as, e.g., an automatically-executed link to the hosting server, updates to the slide presentation hosted at the server enables retroactive changes to previously-sent emails.

Figure 1:
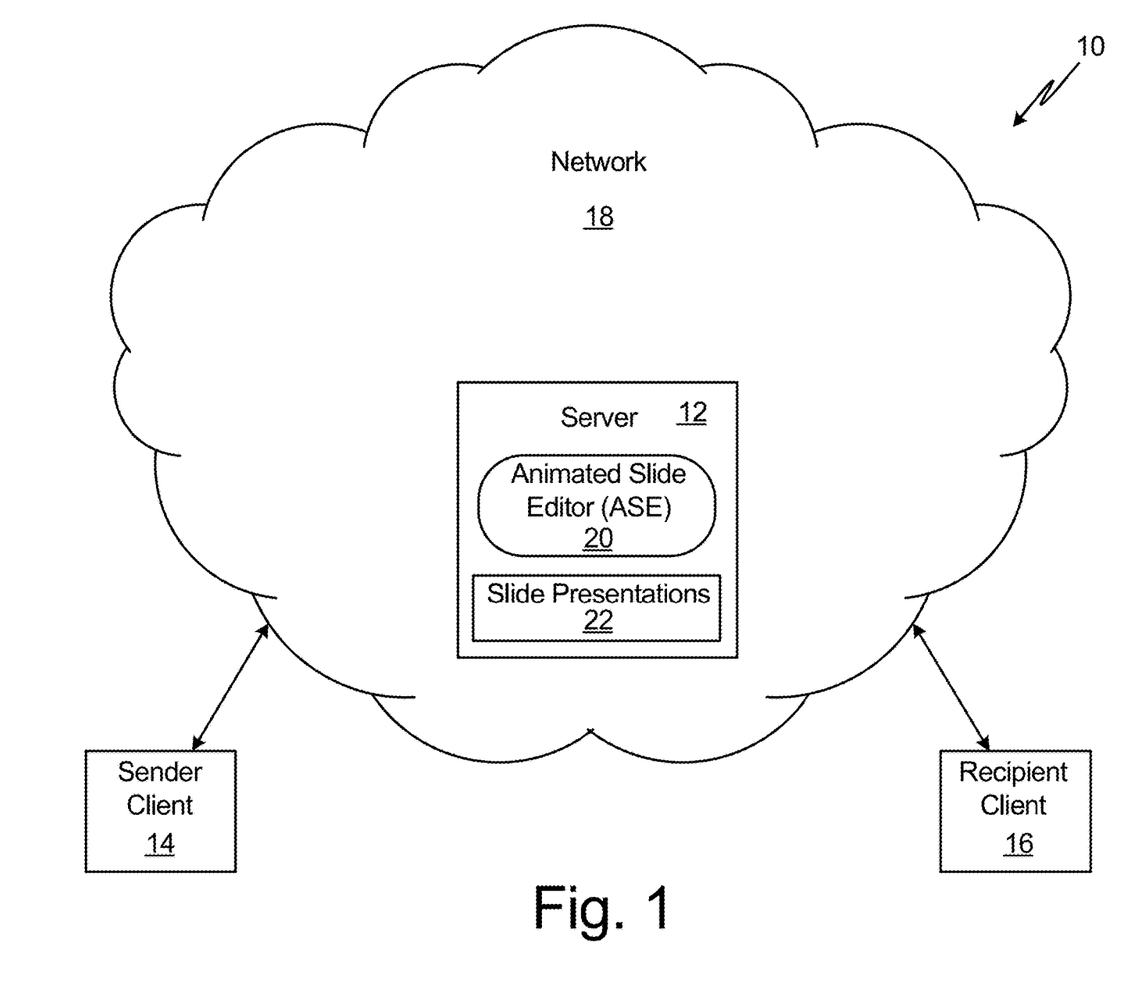
FIG. 1 is a schematic block diagram of an example system for generating animated email signatures using an animated slide editor.

FIG. 1 is a schematic block diagram of system 10 for generating an animated email signature. As illustrated in FIG. 1, system 10 includes server 12, sender client 14, recipient client 16, and communications network 18. Server 12 includes animated slide editor (ASE) 20 and slide presentations 22.

Communications network 18, as illustrated in FIG. 1, communicatively couples components of system 10. Examples of communication network 18 can include wired or wireless networks or both, such as local area networks (LANs), wireless local area networks (WLANs), cellular networks, wide area networks (WANs) such as the Internet, or other types of networks. In some examples, communications network 18 can include multiple interconnected server devices and/or computer system resources that distribute data storage, access, and functionality among the multiple devices and/or resources, often referred to as the "cloud."

As illustrated in FIG. 1, server 12 can be included within communications network 18 (e.g., the cloud). In other examples, server 12 can be separate from communications network 18 and communicatively coupled with components of system 10 (e.g., sender client 14 and recipient client 16) via communications network 18. Server 12 can be, e.g., a mainframe computer, a desktop computer, a laptop computer, a tablet computer, or other type of computing device configured to execute ASE 20 and store (or access) slide presentations 22 according to techniques described herein. For instance, in some examples, server 12 can take the form of a web server that hosts ASE 20 for access by, e.g., sender client 14 for generating an animated email signature that is received/accessed by recipient client 16, as is further described below.

Sender client 14 and recipient client 16, as illustrated in FIG. 1, are communicatively coupled to each other and to server 12 via communications network 18. Examples of sender client 14 and recipient client 16 include, e.g., laptop computers, tablet computers, mobile phones (e.g., smartphones), desktop computers, personal digital assistants (PDAs), or other types of computing devices capable of sending and receiving email.

Each of server 12, sender client 14, and recipient client 16 include one or more processors and computer-readable memory encoded with instructions that, when executed by the one or more processors, cause server 12, sender client 14, and recipient client 16 to operate in accordance with techniques described herein. Examples of one or more processors include any one or more of a microprocessor, a digital signal processor (DSP), an application specific integrated circuit (ASIC), a field-programmable gate array (FPGA), or other equivalent discrete or integrated logic circuitry.

Computer-readable memory of server 12, sender client 14, and recipient client 16 can be configured to store information within server 12, sender client 14, and recipient client 16 during operation. For instance, computer-readable memory of server 12 can store instructions that, when executed by one or more processors of server 12, cause server 12 to operate in accordance with techniques attributed herein to ASE 20. Computer-readable memory can include volatile and/or non-volatile memory elements. Examples of volatile memory can include random access memory (RAM), dynamic random access memory (DRAM), static random access memory (SRAM), and other forms of volatile memory. Examples of non-volatile memory can include magnetic hard discs, optical discs, flash memories, forms of electrically programmable memory (EPROM), electrically erasable and programmable (EEPROM) memory, or other forms of non-volatile memory. In some examples, computer-readable memory can include a non-transitory medium. The term "non-transitory" can indicate that the storage medium is not embodied in a carrier wave or a propagated signal. In certain examples, a non-transitory storage medium can store data that can, over time, change (e.g., in RAM or cache).

In operation, server 12 executes ASE 20 to enable a user to generate an animated slide signature including an animated image file that presents a series of time-cycled slides having graphical and/or textual data for display in an email signature block. For example, server 12 can execute ASE 20 as a web application that presents graphical control elements accessible via a web browser application executed at a remote computing device, such as sender client 14. In such an example, a user can access ASE 20 via the web browser executed by, e.g., sender client 14, to generate the animated slide signature, as is further described below. Server 12 generates the animated slide signature as including an animated image file that is stored at server 12, illustrated in the example of FIG. 1 as slide presentations 22. Examples of animated image files can include, for example, Graphics Interchange Format (GIF) files, video files such as Moving Picture Experts Group (MPEG) Part 14 (MP4) files or QuickTime multimedia format (MOV) files, or other animated image files.

In response to a user accessing ASE 20 to generate the animated slide signature, server 12 generates the animated image file and stores the generated animated image file (e.g., slide presentations 22) within computer-readable memory of server 12 or at a remote server device (not illustrated) that is accessible by server 12 via, e.g., communications network 18. ASE 20, executing on server 12, further generates computer-readable instructions that, when executed by an email client application, causes the email client application to access the animated image file stored at slide presentations 22 of server 12 and to display the animated image file as an animated slide signature of a received email. For instance, ASE 20 can generate Hypertext Markup Language (HTML) instructions, JavaScript instructions, Extensible Markup Language (XML) instructions, or other computer-readable instructions that, when executed by an email client application of a remote computing device (e.g., recipient client 16), cause the email client application to access the animated image file stored at slide presentations 22 of server 12 to retrieve the animated image file from server 12 and to present (e.g., display) the animated image file as an animated email signature within a received email.

The computer-readable instructions corresponding to the animated image file stored at slide presentations 22 of server 12 are inserted into outgoing emails of the user associated with the animated image file. For example, ASE 12 can present the computer-readable instructions (e.g., via the web interface) to the user generating the animated email signature. The user can, in certain examples, copy the computer-readable instructions into signature block settings of an email client executed by sender client 14 for automatic insertion into outgoing emails transmitted by the email client of sender client 14. In other examples, the computer-readable instructions directing email clients to the animated image file stored at slide presentations 22 of server 12 can be automatically inserted by ASE 20 into the signature block settings of the email client executed by sender client 14.

In response to a user generating an outgoing email from sender client 14, the email client executed on sender client 14 inserts the computer-readable instructions corresponding to the animated image file stored at slide presentations 22 into the outgoing email. In some examples, sender client 14 executes the computer-readable instructions during composition of the outgoing email to enable the sending (i.e., composing) user to view the animated email signature including the animated image file prior to sending.

Recipient client 16 receives the email from sender client 14 via communications network 18. Recipient client 16, in response to receiving the email, executes the computer-readable instructions included in the email transmitted by sender client 14. The computer-readable instructions included in the received email cause recipient client 16 (e.g., via an email client application executed by recipient client 16) to access the animated email signature stored at slide presentations 22 (including the animated image file) and to display the animated email signature including the animated image file as an animated signature in the received email. The animated image file can be displayed as a time-cycled ordered sequence of individual images that are included in (or used for the generation of) the animated image file.

As such, in some examples, the animated image file of the animated email signature is displayed at recipient client 16 without requiring the animated image file or images/text associated therewith to be inserted into the transmitted email. Rather, the computer-readable instructions directing recipient client 16 to slide presentations 22 of server 12 are included in the email, such that recipient client 16 is directed to the location of the animated image file stored at slide presentations 22 in memory of server 12. Accordingly, techniques of this disclosure decrease the network bandwidth required to include the animated email signature with transmitted emails.

Moreover, the techniques described herein enable a user to update the animated email signature stored at slide presentations 22 for retroactive inclusion with previously-transmitted emails. That is, because outgoing emails including the animated email signature include the computer-readable instructions directing receiving clients (e.g., recipient client 16) to the memory location of slide presentations 22 to retrieve the animated email signature, rather than including (e.g., attaching, appending, or otherwise including) the animated image file directly within the outgoing email, changes to the animated email signature and animated image file stored at slide presentations 22 are displayed even when the email is viewed within the email client after first receiving the email. For instance, a first viewing of a received email at recipient client 16 can direct recipient client 16 (via the computer-readable instructions within the email signature) to a first instance of slide presentations 22 having a first animated image file. A second viewing of the received email at recipient client 16 (i.e., at a later time) can direct recipient client 16 to a second instance of slide presentations 22 having a second (i.e., changed) animated image file. In this way, the techniques of this disclosure can enable users to update the animated email signature that is included outgoing emails, the updated animated email signature being displayed with respect to emails that were transmitted prior to the creation (or modification) of the updated email signature.

FIGS. 2A-2G are example screenshots of a graphical user interface presented by ASE 20 (FIG. 1) during generation of the animated email signature. For purposes of clarity and ease of discussion, the example screenshots of FIGS. 2A-2G are described below within the context of system 10 of FIG. 1.

Figure 2A:
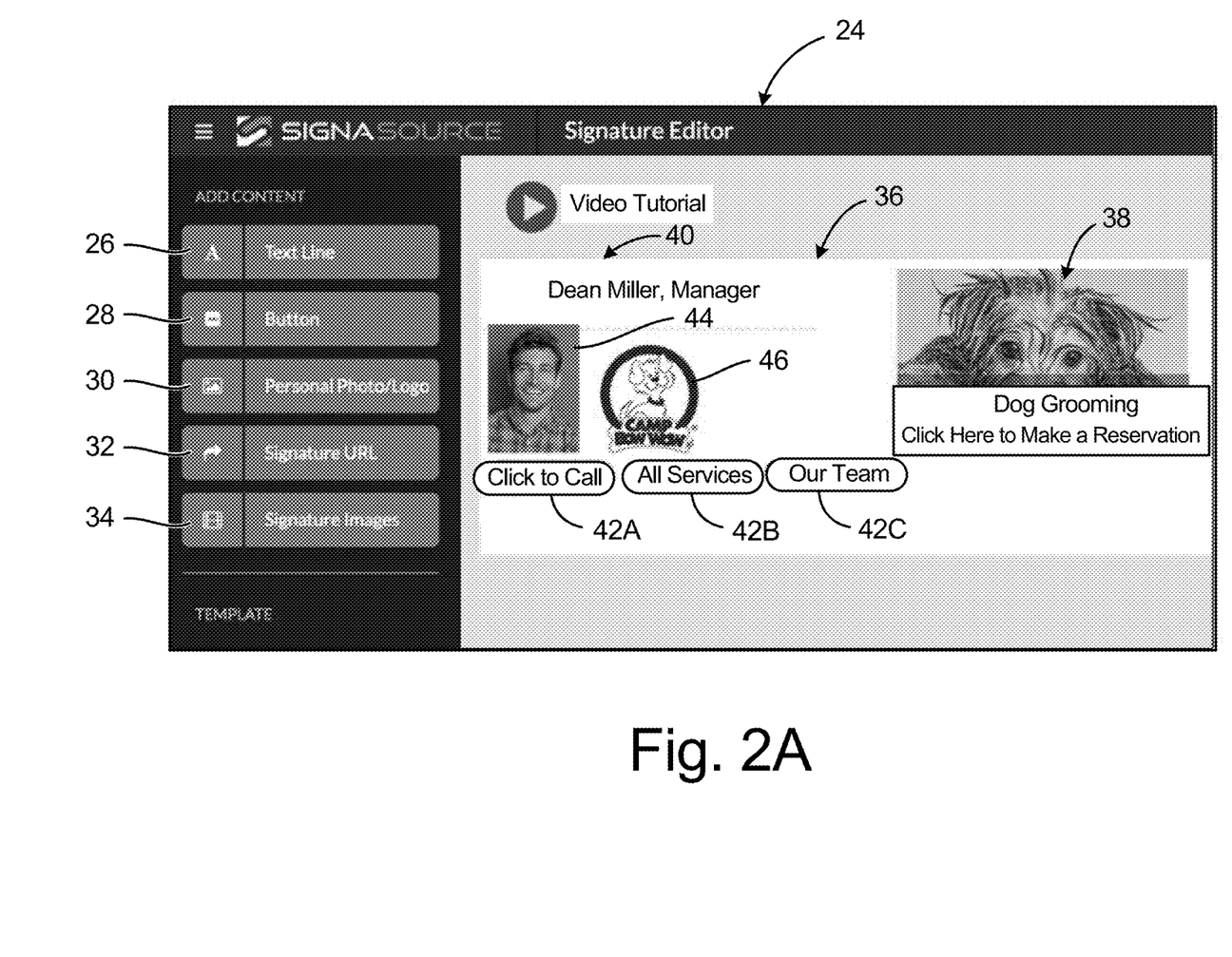
FIGS. 2A-2G are example screenshots of a graphical user interface presented by the animated slide editor during generation of the animated email signature.

FIG. 2A is a screenshot of template page 24 that is displayed at, e.g., sender client 14 accessing ASE 20 during generation of an animated email signature. As illustrated in FIG. 2A, template page 24 displays graphical control elements including text line selector 26, button selector 28, personal photo/logo selector 30, signature uniform resource locator (URL) selector 32, and signature images selector 34. Template page 24 further displays animated email signature 36, which includes animated image 38.

Graphical control elements 26, 28, 30, 32, and 34 enable user interaction to edit animated email signature 36. For example, in response to receiving a user selection of text line selector 26, ASE 20 enables textual data to be input and/or edited for display within animated email signature 36, such as textual data 40 including, e.g., name, title, address, telephone number, or other textual data relating to the email signature of the user. In response to receiving a user selection of button selector 28, ASE 20 enables one or more graphical control buttons to be inserted into animated email signature 36, such as buttons 42A, 42B, and 42C.

In response to receiving a user selection of personal photo/logo selector 30, ASE 20 enables one or more image files to be uploaded and displayed within animated email signature 36, such as personal photo 44 and logo image 46. In response to receiving a user selection of signature URL selector 32, ASE 20 enables a URL (not illustrated) to be inserted within email signature 36, such as at a location beneath buttons 42A-42C. In response to receiving user input to select signature images selector 34, ASE 20 enables selection and editing of animated image 38.

Figure 2B:
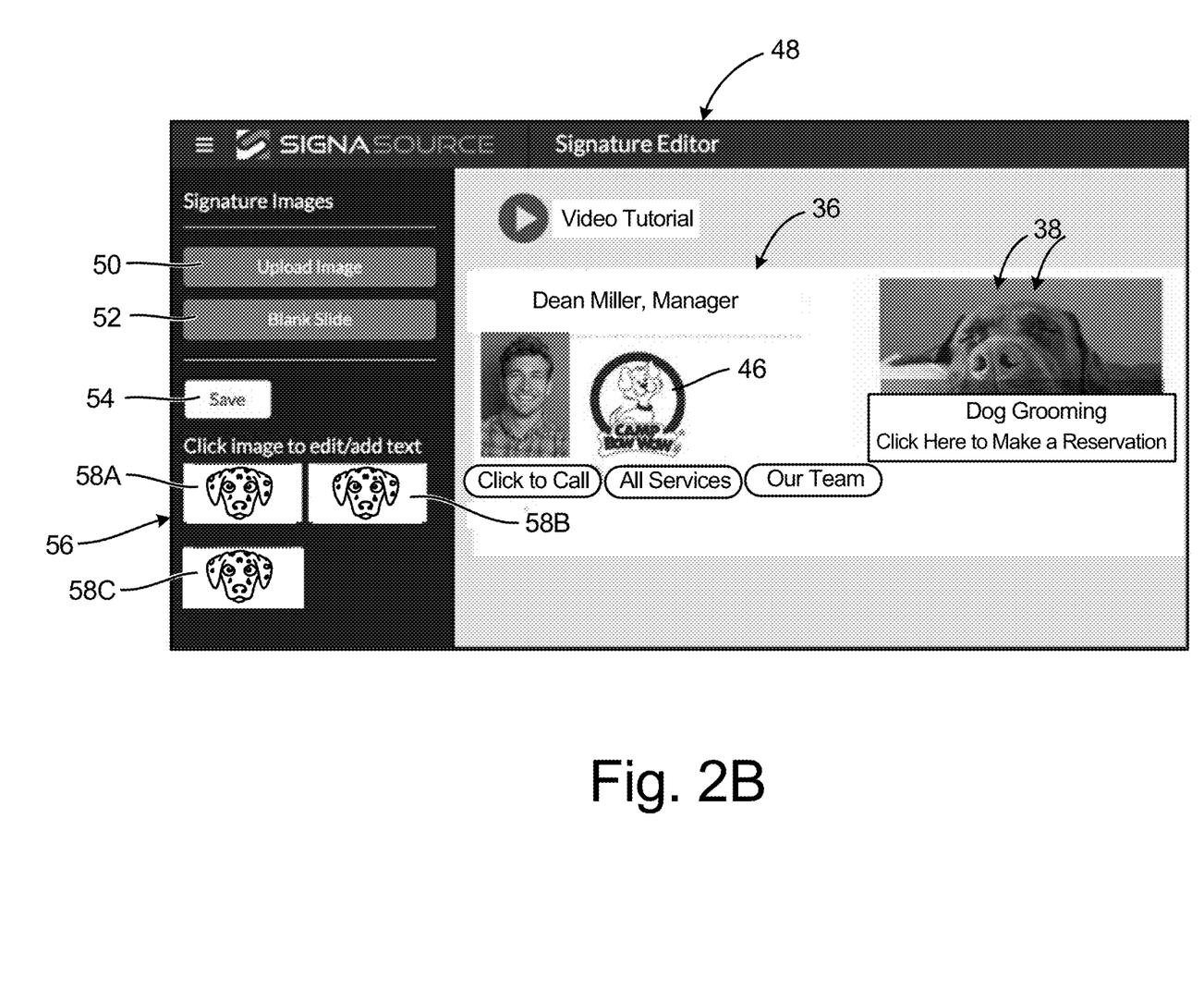

FIG. 2B is a screenshot of signature images page 48 that is output for display by ASE 20 in response to user selection of signature images selector 34 of template page 24. As illustrated in FIG. 2B, signature images page 48 displays animated email signature 36 including animated image 38, upload image selector 50, blank slide selector 52, save selector 54, and existing images selection region 56. Existing images selection region 56 displays one or more existing images that are displayed sequentially in a time-cycled manner to generate animated image 38. That is, ASE 20 generates the animated image file (e.g., a GIF or other animated image file) to display animated image 38 as a compilation of images included in existing images selection region 56. Animated image 38 therefore displays images included within existing images selection region 56 sequentially in the time-cycled manner, the time delay between the displaying of the images being customizable via ASE 20, as is further described below.

ASE 20 displays the images within existing images selection region 56 sequentially in a left-to-right and top-to-bottom sequence, such that an image displayed at an upper-left corner of existing images selection region 56 is displayed first and an image at a lower-right corner of existing images selection region 56 is displayed last. In the example of FIG. 2B, ASE 20 generates animated image 38 such that existing image 58A is displayed first, existing image 58B is displayed second, and existing image 58C is displayed third (and last, in this example). ASE 20 further generates animated image 38 such that the images are continually sequenced, such that the first image in the sequence of images (e.g., existing image 58A) is displayed after the last image in the sequence of images (e.g., existing image 58C) is displayed and the images are continually displayed in the sequence.

While the example of FIG. 2B illustrates three images that are sequenced as part of animated image 38, it should be understood that the techniques of this disclosure can enable any number of images to be included in animated image 38. In examples where a single image is included in animated image 38, the single image is statically displayed as animated image 38.

Signature images page 48, as illustrated, provides graphical control elements to enable a user to add additional images to animated image 38 and/or edit existing images that are included in animated image 38 (e.g., any one or more of existing images 58A, 58B, and 58C). For instance, in response to receiving user selection of upload image selector 50, ASE 20 provides graphical control elements (e.g., an upload file browsing control element) to enable user selection of an additional image to be included in animated image 38 and displayed within existing images selection region 56. An uploaded additional image is inserted into the sequence of images within animated image 38 as a new last image and displayed accordingly within existing images selection region 56. For instance, in the example of FIG. 2B, an additional uploaded image is inserted as fourth in the sequence of images (i.e., sequentially after existing image 58C) and displayed in the lower right corner of existing images selection region 56. ASE 20 enables reordering of the sequence of images via drag-and-drop user selection to select one of the existing images and move the existing image to a new position within existing images selection region 56, the sequential order of presentation of the existing images within animated image 38 being updated accordingly.

As illustrated in FIG. 2B, signature images page 48 further displays blank slide selector 52. In response to receiving user selection of blank slide selector 52, ASE 20 generates a blank image that is inserted into the sequence of images within animated image 38 as a new last image (i.e., a blank image) and displayed accordingly within existing images selection region 56. The new blank slide can be edited (e.g., via addition of text or other graphical information) after user selection of the blank slide within existing images selection region 56. That is, ASE 20 provides graphical control elements that enable editing of an existing image in response to user selection of any one of the images within existing images selection region 56 (e.g., any of existing images 58A, 58B, 58C, any new uploaded image, or any new blank slide image). For example, in response to receiving user selection of an existing image displayed within existing images selection region 56, ASE 20 displays graphical control elements to enable editing of the selected signature image.

Figure 2C:
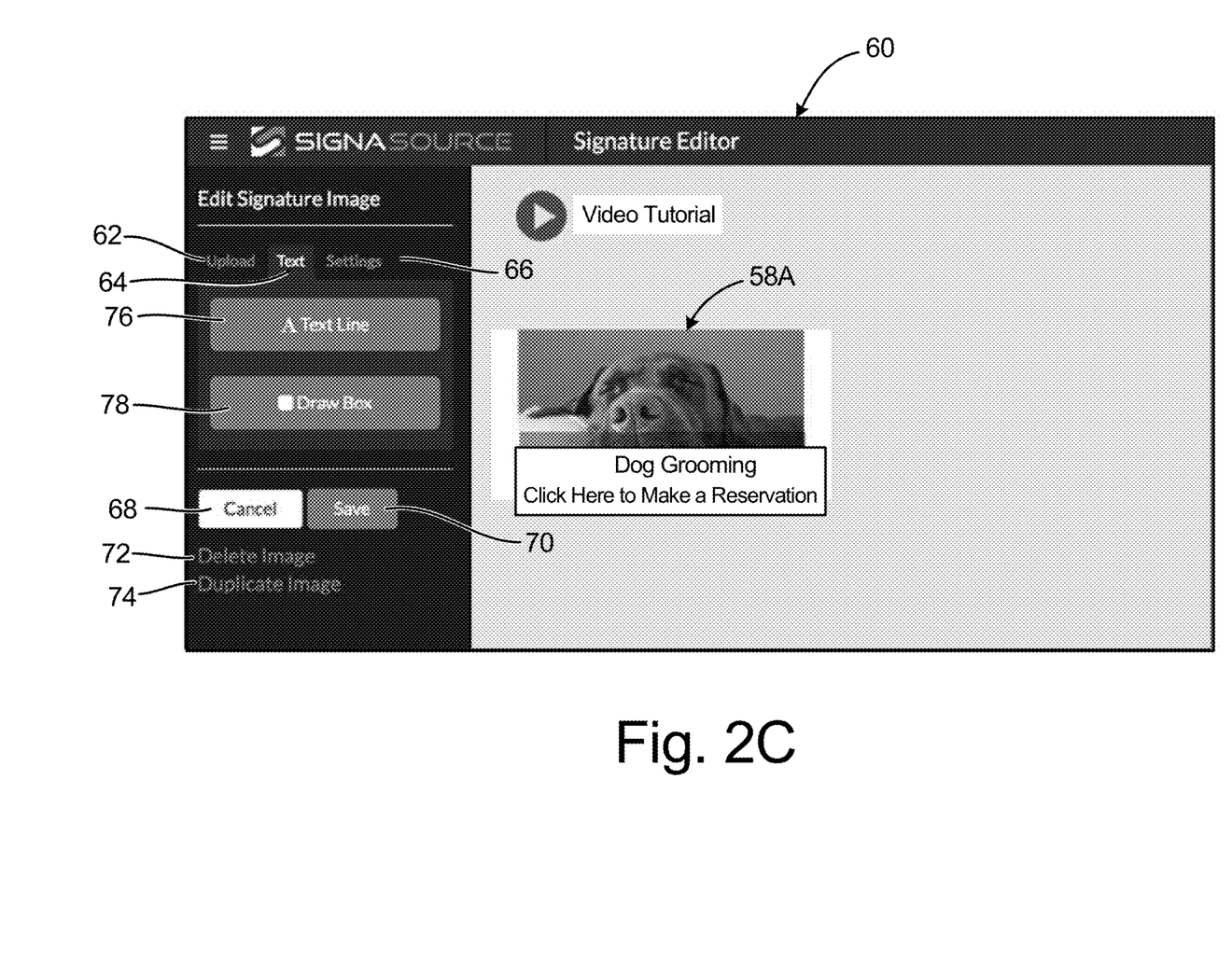

FIG. 2C is a screenshot of edit signature image page 60 that is output for display by ASE 20 in response to user selection of existing image 58A from existing images selection region 56 of FIG. 2B. As illustrated in FIG. 2C, edit signature image page 60 displays existing image 58A, upload selection tab 62, text selection tab 64, settings selection tab 66, cancel selector 68, save selector 70, delete image selector 72, and duplicate image selector 74. Upload selection tab 62, text selection tab 64, and settings selection tab 66 are persistently displayed by signature image page 60 to enable user selection of any of selection tab 62, text selection tab 64, and settings selection tab 66 from signature image page 60. In the example of FIG. 2C, text selection tab 64 is selected, and text line selector 76 and draw box selector 78 are displayed.

In response to user selection of delete image selector 72, ASE 20 removes the selected image (e.g., existing image 58A in the example of FIG. 2C) from the sequence of images included in animated image 38 (FIGS. 2A and 2B). In addition, ASE 20 removes the selected image (e.g., existing image 58A) from display within existing images selection region 56 (FIG. 2B). In response to user selection of duplicate image selector 74, ASE 20 duplicates the selected image (e.g., existing image 58A) and inserts the duplicated image into the sequence of images included in animated image 38. In some examples, ASE 20 inserts the duplicated image as a sequentially-next image with respect to the selected image (e.g., existing image 58A) in the sequence of images included in animated image 38. In other examples, ASE can insert the duplicated image as a last image in the sequence of images included in animated image 38. In response to user selection of text line selector 76 from text selection tab 64, ASE 20 provides graphical control elements that enable the insertion of textual data that can be overlaid on the selected image.

Figure 2D:
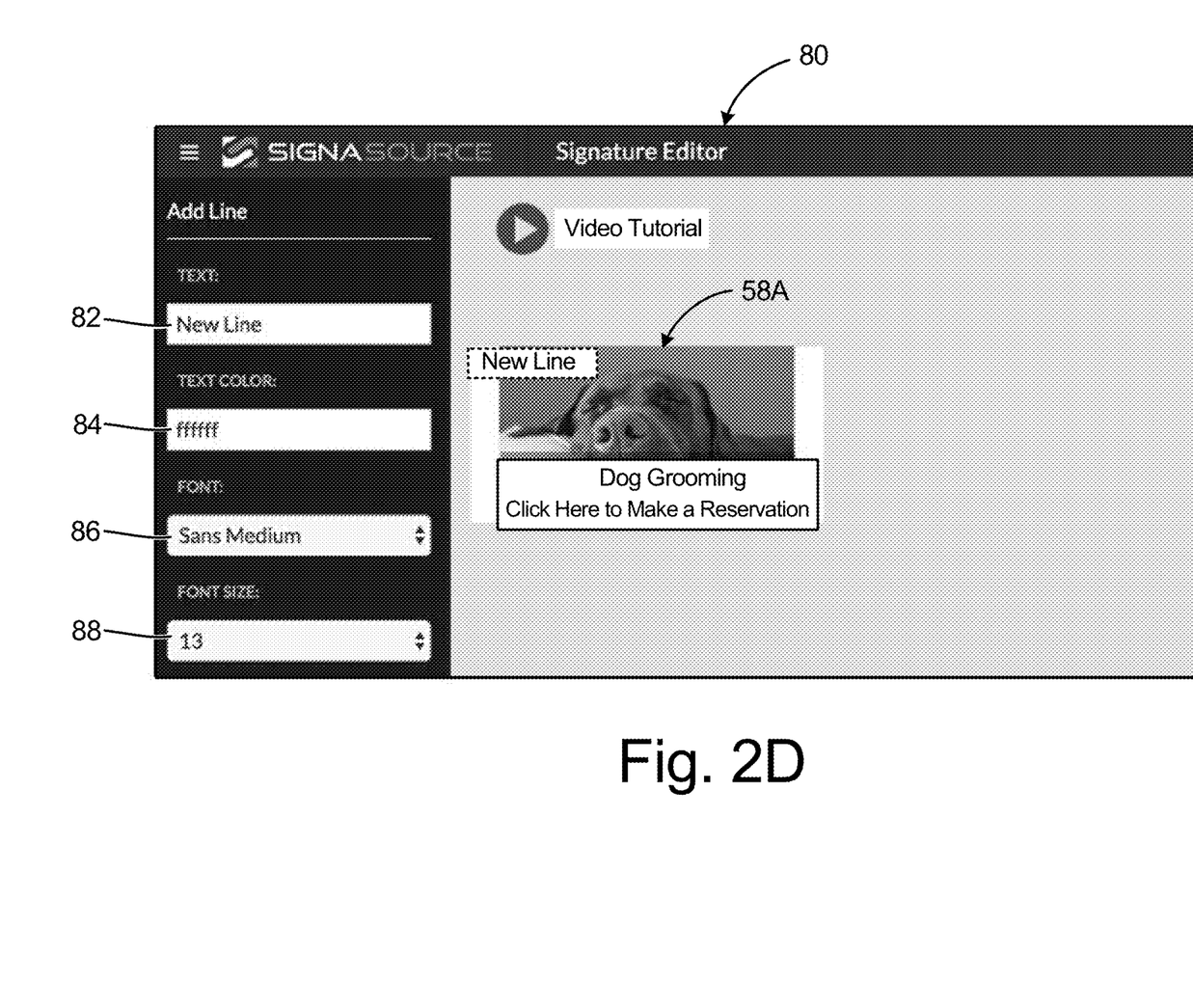

FIG. 2D is a screenshot of edit text line page 80 that is output for display by ASE 20 in response to user selection of text line selector 76 (FIG. 2C). As illustrated in FIG. 2D, edit text line page 80 displays text line input 82, text color input 84, text font selector 86, and font size selector 88. Edit text line page 80, as illustrated in FIG. 2D, further displays the selected image (existing image 58A in the example of FIG. 2D).

Text line input 82 is a graphical control element that accepts alphanumeric textual data (e.g., via hard or soft keyboard input) that is displayed as a graphical overlay on the selected image (existing image 58A in this example). For instance, in the example of FIG. 2D, the textual data "New Line" is provided within text line input 82 (e.g., via user input) and is displayed as a graphical overlay on existing image 58A. The position of the textual data with respect to the selected image (e.g., existing image 58A) can be modified by, e.g., drag-and-drop user input to move the location of the graphically-overlaid textual data with respect to the selected image.

Text color input 84, in the example of FIG. 2D, is a graphical control element that accepts textual data corresponding to hexadecimal red-green-blue (RGB) color codes, such as the hexadecimal RGB color code "ffffff" corresponding to a white color. In other examples, text color input 84 can be a drop-down menu, a color-picker menu, or other graphical control element that enables user selection of a specific color. ASE 20 displays the graphically-overlaid textual data as having the color defined by text color input 84.

Font text font selector 86 is a graphical control element (e.g., a drop-down menu or other graphical control element) that enables user selection of a font with which ASE 20 displays the graphically-overlaid textual data, such as the font "Sans Medium" illustrated in the example of FIG. 2D. Font size selector 88 is a drop-down menu or other graphical control element that enables user selection of a size of the graphically-overlaid textual data. Accordingly, edit text line page 80 provides graphical control elements that enable user input to insert graphically-overlaid textual data to a selected image.

Figure 2E:
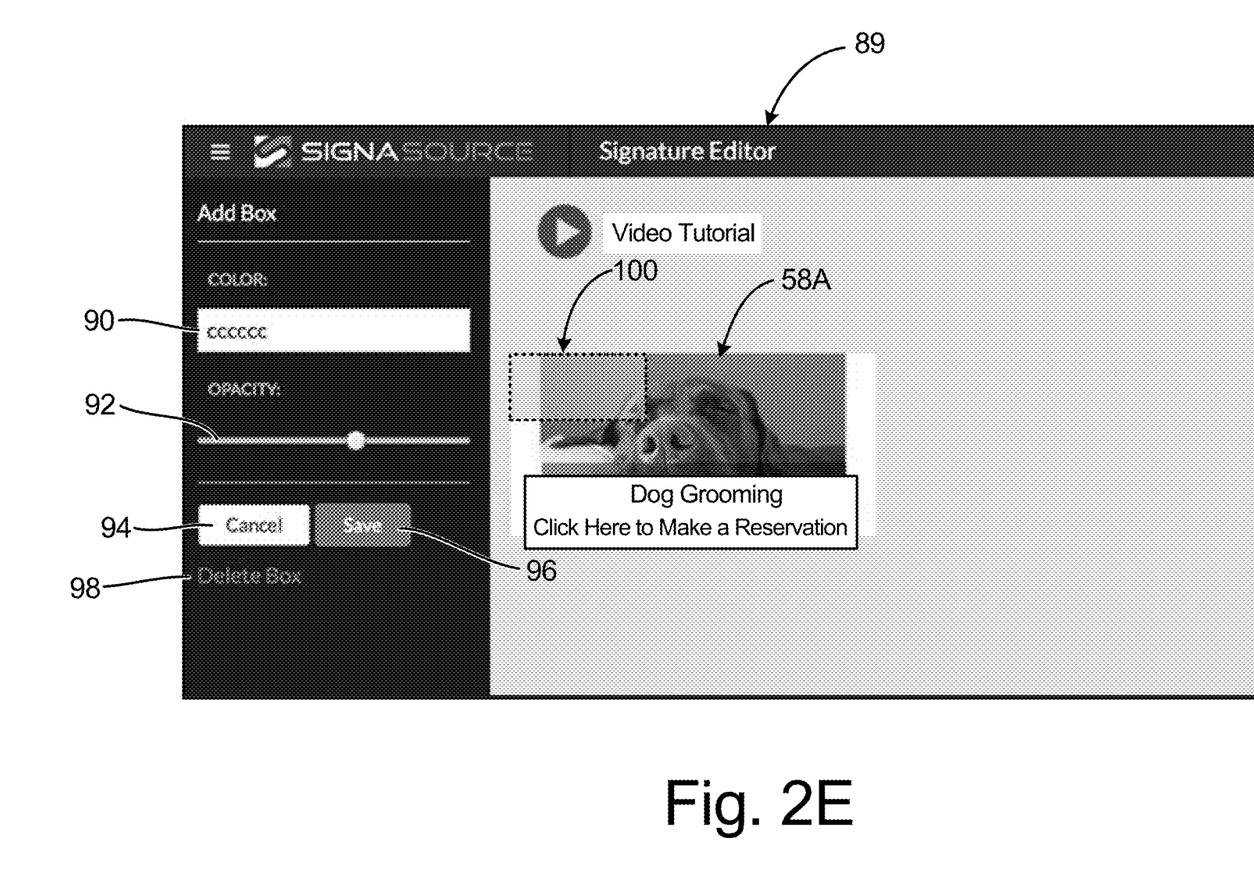

FIG. 2E is a screenshot of draw box page 89 that is output for display by ASE 20 in response to user selection of draw box selector 78 of FIG. 2C. As illustrated in FIG. 2E, draw box page 89 displays box color input 90, opacity selector 92, cancel selector 94, save selector 96, and delete box selector 98. As illustrated in FIG. 2E, ASE 20 presents graphical control elements to enable a user to define the location and size of a box that is graphically overlaid on the selected image, such as box 100 in the example of FIG. 2E. For instance, ASE 20 enables a user to click-and-drag on the displayed image (e.g., existing image 58A in this example) to define the locations of the upper-left corner of the box (i.e., corresponding to the starting location of the click-and-drag input) and the lower-right corner of the box (i.e., corresponding to the ending location of the click-and-drag input). In examples where no image is displayed (e.g., a blank slide), the box can be displayed by itself (i.e., rather than a graphical overlay on an image).

In some examples, ASE 20 automatically controls the graphical presentation of the box to be presented (i.e., displayed) in front of a photograph or other image data and behind textual information. Accordingly, ASE 20 can present graphical layers of images, text, and boxes, such that text is presented in front of boxes and images, boxes are presented behind text and in front of images, and images are presented behind both text and boxes. Further graphical control elements can be provided by ASE 20 to enable text and boxes to be graphically repositioned. In some examples, images are cropped and centered based on a shortest edge of a pre-defined area for image presentation.

Box color input 90, in the example of FIG. 2E, is a graphical control element that accepts textual data corresponding to hexadecimal red-green-blue (RGB) color codes, such as the hexadecimal RGB color code "cccccc" corresponding to a grey color. In other examples, box color input 90 can be a drop-down menu, a color-picker menu, or other graphical control element that enables user selection of a specific color. ASE 20 displays the box (e.g., the graphically-overlaid box) as having the color defined by box color input 90.

Opacity selector 92 is a graphical control element that enables user selection of an opacity level of the displayed box. In the example of FIG. 2E, opacity selector 92 is a graphical slider control element that enables user selection of the opacity level of the displayed box ranging from fully transparent (e.g., a far left end of the slider) to fully opaque (e.g., a far right end of the slider), though in other examples, the limits of the opacity slider can correspond to other opacity levels. For instance, in some examples, the far left end of the slider of opacity selector 92 can correspond to an opacity level that is not completely transparent (e.g., slightly opaque), and the far right end of the slider of opacity selector 92 can correspond to an opacity level that is not completely opaque (e.g., slightly transparent). In other examples, opacity selector 92 can be a graphical control element that is different than a graphical slider control element, such as a text input box that accepts textual data corresponding to an opacity level, a drop down menu that presents a plurality of pre-defined opacity levels, or other graphical control element.

Delete box selector 98 enables a user to delete a selected box, such as box 100 of the example of FIG. 2E. Cancel selector 94 enables user selection to cancel the addition of the box as the graphical overlay, and save selector 96 enables user selection to save the addition of the box.

Figure 2F:
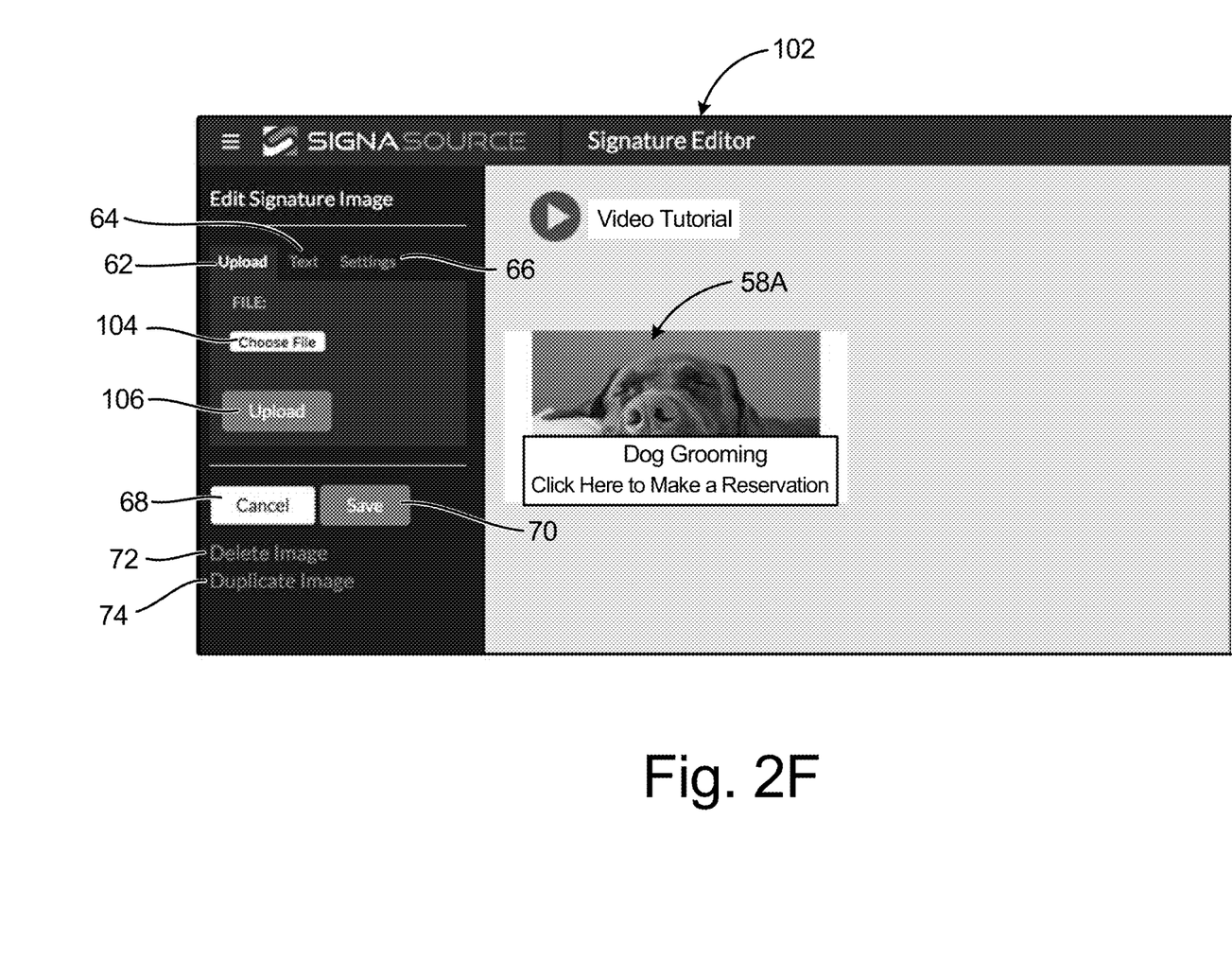

FIG. 2F is a screenshot of image upload page 102 that is output for display by ASE 20 in response to user selection of upload selection tab 62 of FIG. 2C. That is, in the example of FIG. 2C, upload selection tab 62, text selection tab 64, and settings selection tab 66 are persistently displayed, with text selection tab 64 being selected in the example of FIG. 2C. FIG. 2F illustrates an example of graphical control elements that are displayed by ASE 20 in response to user selection of upload selection tab 62.

As illustrated in FIG. 2F, upload selection tab 62 displays file selector 104 and upload selector 106. In addition, cancel selector 68, save selector 70, delete image selector 72, duplicate image selector 74, and existing image 58A are also displayed. That is, in the example of FIG. 2F, in response to user selection of upload selection tab 62, ASE 20 continues to display cancel selector 68, save selector 70, delete image selector 72, duplicate image selector 74, and existing image 58A, but replaces the display of text line selector 76 and draw box selector 78 (FIG. 2C) with file selector 104 and upload selector 106.

In response to user selection of file selector 104, ASE 20 presents graphical control elements, such as graphical file browsing control elements, that enable user selection of an image file to be uploaded as the selected image (e.g., to replace the selected image). In response to user selection of upload selector 106, ASE 20 uploads the image file and replaces the selected file (e.g., existing image 58A) with the uploaded image in the sequence of images included in animated image 38 (e.g., FIGS. 2A and 2B). The uploaded image can be uploaded from, e.g., sender client 14 (FIG. 1) to server 12 (FIG. 1) and stored in slide presentations 22 (FIG. 1).

Figure 2G:
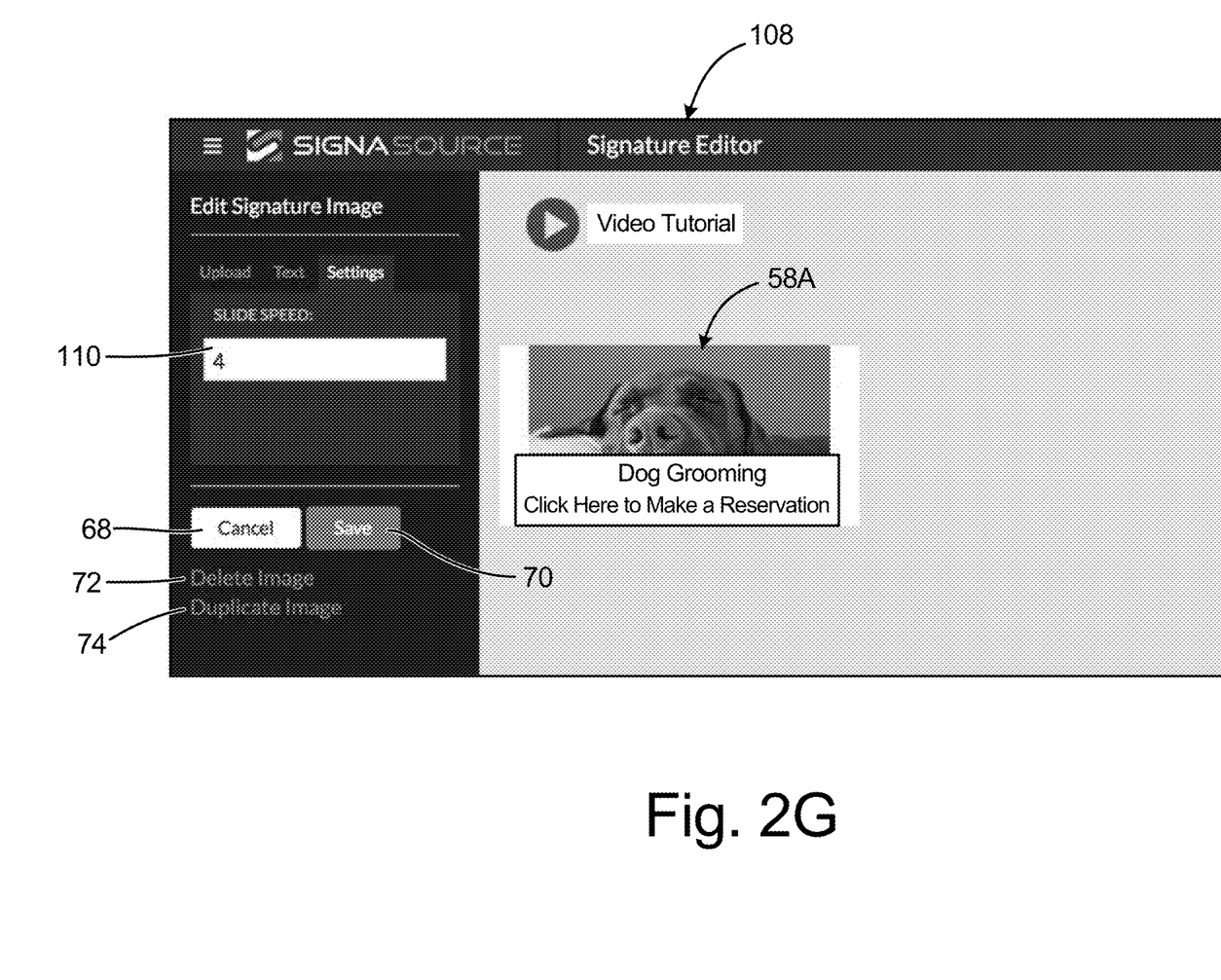

FIG. 2G is a screenshot of image settings page 108 that is output for display by ASE 20 in response to user selection of settings selection tab 66 of FIG. 2C. As illustrated in FIG. 2G, image settings page 108 displays slide speed input 110. In addition, cancel selector 68, save selector 70, delete image selector 72, duplicate image selector 74, and existing image 58A are also displayed.

Slide speed input 110, in the example of FIG. 2G, is a graphical control element that accepts textual data corresponding to a time duration for which the selected image (e.g., existing image 58A) is displayed in animated image 38 (FIGS. 2A and 2B) prior to display of a subsequent image in animated image 38. The time duration can range from, e.g., a tenth of a second to multiple seconds, or other time durations. In some examples, the selected time duration can be applied to each of the images in animated image 38, such that each individual image in animated image 38 is displayed for the selected time duration prior to display of a sequentially-next image in animated image 38. In other examples, each of the images in animated image 38 can be associated with an individually-selected time duration for which the selected image is displayed, each of the individually-selected time durations being the same or different time duration.

While illustrated in the example of FIG. 2G as a text input control element, slide speed input 110 can take the form of any graphical control element that enables user input to identify the time duration for which the selected image (or images) are displayed in animated image 38. For instance, slide speed input 110 can be a slider control element that enables user interaction to adjust the time duration for display between a lower threshold time duration (e.g., a tenth of a second, or other lower threshold time duration) and an upper threshold time duration (e.g., ten seconds, or other upper threshold time duration). In general, slide speed input 110 can be any graphical control element that enables user input to identify the time duration for which the selected image or images are displayed in animated image 38. The identified time duration can be in units of minutes, seconds, tenths of seconds, or other units of time. In some examples, the identified time duration can be in unitless form, but scaled to a range of time durations (e.g., in seconds). For instance, the identified time duration can be a unitless quantity ranging from 1 to 10 (or other unitless range) that is scaled to a pre-defined range of time durations, such as a pre-defined range of time durations from a tenth of a second to five seconds, or other pre-defined range of time durations.

ASE 20 generates the animated image file using the existing images, such as existing images 58A, 58B, and 58C (FIG. 2B). The animated image file, which can be a GIF file or other type of animated image file, is stored within memory of server 12 (e.g., slide presentations 22 of FIG. 1) and defines animated image 38 (FIGS. 2A and 2B) which displays the images (e.g., images 58A-58C) in a time-cycled ordered sequence. ASE 20 further generates computer-readable instructions that are inserted into outgoing emails of a sending client (e.g., sender client 14 of FIG. 1). The computer-readable instructions cause a recipient of the email (e.g., recipient client 16 of FIG. 1) to retrieve the animated image file and display the animated image defined by the animated image file within the signature block region of the received email. As such, ASE 20, implementing techniques of this disclosure, enables user interaction to define an animated email signature that includes an animated image file that is displayed by recipients of outgoing emails transmitted by the email sender.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A server device for use in a system including a sender client device and a recipient client device that are remote from and communicatively coupled with the server device via a communication network, the server device comprising:
   one or more processors; and
   an animated slide editor executable by the one or more processors to:
   present, at the sender client device, a graphical user interface that enables user interaction to upload a plurality of images to the server device for inclusion in an animated image file as an animated email signature that defines an animated image that is displayed within a signature block region of an email transmitted from the sender client device;
   receive, via the graphical user interface, the user interaction to upload the plurality of images to the server device;
   receive, via the graphical user interface, user interaction to select a signature uniform resource locator (URL) to insert within the animated email signature;
   receive, at the server device, the plurality of images uploaded from the sender client device;
   generate, by the animated slide editor, the animated image file using the plurality of uploaded images;
   store, by the animated slide editor, the animated image file at a memory location within memory of the server device; and
   generate, by the animated slide editor, computer-readable instructions for insertion of the animated image file into the email transmitted from the sender client device, wherein the computer-readable instructions are configured to cause the sender client device to:
   insert, by the sender client device prior to transmitting the email, the computer-readable instructions into the email, wherein the computer-readable instructions include the animated image file inserted as an automatically-executed signature URL directed to the server instead of attaching the animated image file as the animated email signature directly within the email when transmitted from the sender client device;
   wherein the computer-readable instructions are configured to cause the recipient client device, in response to receiving the email transmitted from the sender client device, to:
   execute the computer-readable instructions inserted into the email;
   access, via the automatically-executed signature URL, the memory location within the memory of the server device at which the animated image file is stored;
   retrieve the animated image file stored at the memory location within the memory of the server device; and
   display, as the animated email signature at the recipient client device, the animated image defined by the animated image file in the signature block region of the received email transmitted from the sender client device;
   wherein the animated slide editor is further executable by the one or more processors to:
   receive, at the sender client device via the graphical user interface, user interaction to edit the animated image retrieved from the memory location within the memory of the server device; and
   automatically update the animated image file that enables retroactive changes to previously-sent emails transmitted to the recipient client device.

2. The server device of claim 1,
wherein the animated slide editor is remotely accessible by the sender client device to receive the user interaction to upload the one or more images via the sender client device.

3. The server device of claim 1,
wherein the animated image file defines the animated image such that the plurality of uploaded images are displayed by the animated image individually in a time-cycled ordered sequence.

4. The server device of claim 1,
wherein the graphical user interface displays a signature images page including an upload image selector graphical control element; and
wherein the animated slide editor presents, in response to receiving user selection of the upload image selector graphical control element, graphical control elements that enable user selection of an image to be uploaded to the server device for inclusion in the animated image file.

5. The server device of claim 4,
wherein the signature images page displays, in an existing images selection region, the plurality of images included in the animated image file; and
wherein the signature images page enables user selection of any one of the plurality of images displayed in the existing images selection region.

6. The server device of claim 5,
wherein the signature images page displays the plurality of images in the existing images selection region in an ordered sequence by which the plurality of images are displayed in the animated image.

7. The server device of claim 5,
wherein the graphical user interface displays an edit signature image page in response to user selection of one of the plurality of images in the existing images selection region as a selected one of the plurality of images, the edit signature image page displaying an upload selection tab graphical control element, a text selection tab graphical control element, and a settings selection tab graphical control element.

8. The server device of claim 7,
wherein the graphical user interface displays, in response to receiving user selection of the text selection tab graphical control element, a text line selector graphical control element, and a draw box selector graphical control element.

9. The server device of claim 8,
wherein the graphical user interface displays an edit text line page in response to user selection of the text line selector graphical control element, the edit text line page displaying:
  a text line input graphical control element that accepts user input of textual data that is displayed as a graphical overlay on the selected one of the plurality of images;
  a text color input graphical control element that accepts user input that defines a color of the textual data that is displayed as the graphical overlay on the selected one of the plurality of images;
  a text font selector graphical control element that accepts user input to select a font of the textual data that is displayed as the graphical overlay on the selected one of the plurality of images; and
  a font size selector graphical control element that accepts user input to select a size of the font of the textual data that is displayed as the graphical overlay on the selected one of the plurality of images.

10. The server device of claim 8,
wherein the graphical user interface displays a draw box page in response to user selection of the draw box selector graphical control element, the draw box page accepting user input to define a location and size of a box that is displayed as a graphical overlay on the selected one of the plurality of images, the draw box page displaying:
  a box color input graphical control element that accepts user input that defines a color of the box that is displayed as the graphical overlay on the selected one of the plurality of images; and
  an opacity selector graphical control element that accepts user input that defines an opacity level of the box that is displayed as the graphical overlay on the selected one of the plurality of images.

11. The server device of claim 10,
wherein the graphical user interface displays the box as the graphical overlay in front of the selected one of the plurality of images and behind textual data displayed as a graphical overlay on the selected one of the plurality of images.

12. The server device of claim 7,
wherein the graphical user interface displays, in response to receiving user selection of the upload selection tab graphical control element, a file selector graphical control element and an upload selector graphical control element;
wherein the file selector graphical control element accepts user input to select an upload image file; and
wherein the upload selector graphical control element accepts user input to cause the upload image file to be uploaded to the server device to replace the selected one of the plurality of images for inclusion in the animated image file.

13. The server device of claim 7,
wherein the graphical user interface displays, in response to receiving user selection of the settings selection tab graphical control element, a slide speed input graphical control element that accepts user input defining a time duration for which the selected one of the plurality of images is displayed in the animated image prior to display of a subsequent image in the animated image file.

14. A method comprising:
executing, by a server device, an animated slide editor that presents, at a sender client device, a graphical user interface that enables user interaction to upload a plurality of images to the server device for inclusion in an animated image file as an animated email signature that defines an animated image that is displayed within a signature block region of an email transmitted from a sender client device;
accessing, by the sender client device that is remote from and communicatively coupled with the server device, the animated slide editor to display the graphical user interface at the sender client device;
receiving, at the sender client device via the graphical user interface, the user interaction to upload the plurality of images to the server device;
receiving, via the graphical user interface, user interaction to select a signature uniform resource locator (URL) to insert within the animated email signature;
uploading the plurality of images from the sender client device to the server device;
receiving, at the server device, the plurality of images uploaded from the sender client device;
generating, by the animated slide editor using the plurality of images, the animated image file that defines the animated image;

storing, by the animated slide editor, the animated image file at a memory location within memory of the server device;

generating, by the animated slide editor, computer-readable instructions for insertion of the animated image file into the email transmitted from the sender client device;

generating, by the sender client device, the email transmitted from the sender client device;

inserting, by the sender client device prior to transmitting the email, the computer-readable instructions into the email, wherein the computer-readable instructions include that the animated image file is inserted as an automatically-executed signature URL directed to the server instead of attaching the animated image file as the animated email signature directly within the email when transmitted from the sender client device;

transmitting the email from the sender client device;

receiving, by a recipient client device that is remote from and communicatively coupled to both the sender client device and the server device, the email transmitted from the sender client device;

executing, by the recipient client device in response to receiving the email, the computer-readable instructions inserted into the email;

accessing, by the recipient client device in response to executing the computer-readable instructions inserted into the email, the memory location within the memory of the server device at which the animated image file is stored;

retrieving, by the recipient client device from the server device in response to executing the computer-readable instructions, the animated image file from the memory location within the memory of the server device;

displaying, at the recipient client device within the signature block region of the email transmitted from the sender client device, the animated image as the animated email signature defined by the animated image file;

receiving, at the sender client device via the graphical user interface, user interaction to edit the animated image retrieved from the memory location within the memory of the server device; and automatically updating the animated image file that enables retroactive changes to previously-sent emails transmitted to the recipient client device.

15. The method of claim 14, wherein the plurality of uploaded images are displayed by the animated image in a time-cycled ordered sequence.

16. The method of claim 14, wherein the inserting the computer-readable instructions into the email transmitted from the sender client is performed by an email client application executing on the sender client device.

\* \* \* \* \*